United States Patent
Zhu

(10) Patent No.: US 11,303,122 B1
(45) Date of Patent: Apr. 12, 2022

(54) JUMPER CABLE DEVICE AND JUMP START SYSTEM

(71) Applicant: SHENZHEN CAROSS CO., LTD, Shenzhen (CN)

(72) Inventor: Chunyi Zhu, Lianyuan (CN)

(73) Assignee: SHENZHEN CAROSS CO., LTD, Shenzhen (CN)

( * ) Notice: Subject to any disclaimer, the term of this patent is extended or adjusted under 35 U.S.C. 154(b) by 0 days.

(21) Appl. No.: 17/395,500

(22) Filed: Aug. 6, 2021

(30) Foreign Application Priority Data

Jul. 6, 2021 (CN) .......................... 202110763308.1
Jul. 6, 2021 (CN) .......................... 202110763309.6

(51) Int. Cl.
*H02J 1/10* (2006.01)
*H02J 7/00* (2006.01)
*H01R 11/24* (2006.01)

(52) U.S. Cl.
CPC .............. *H02J 1/122* (2020.01); *H01R 11/24* (2013.01); *H02J 7/0029* (2013.01)

(58) Field of Classification Search
CPC .......... H02J 1/122; H02J 7/0029; H01R 11/24
USPC ....................................................... 320/105
See application file for complete search history.

(56) References Cited

U.S. PATENT DOCUMENTS

| | | |
|---|---|---|
| 5,189,359 A | 2/1993 | Kronberg |
| 5,635,817 A | 6/1997 | Shiska |
| 5,793,185 A | 8/1998 | Prelec et al. |
| 5,795,182 A | 8/1998 | Jacob |
| 6,212,054 B1 | 4/2001 | Chan |
| 6,262,492 B1 | 7/2001 | Sheng |
| 6,362,599 B1 | 3/2002 | Turner et al. |
| 6,424,158 B2 | 7/2002 | Klang |
| 6,632,103 B1 | 10/2003 | Liu |
| 8,172,603 B1 | 5/2012 | Richardet, Jr. |
| 8,199,024 B2 | 6/2012 | Baxter et al. |
| 8,493,021 B2 | 7/2013 | Richardson et al. |
| 9,007,015 B1 | 4/2015 | Nook et al. |
| 2005/0110467 A1* | 5/2005 | Thomason ............ H02J 7/0034 320/165 |
| 2007/0285049 A1* | 12/2007 | Krieger ............... H01M 50/213 320/105 |
| 2009/0218988 A1 | 9/2009 | Richardson |
| 2012/0091944 A1 | 4/2012 | Rogers |
| 2013/0154543 A1 | 6/2013 | Richardson |
| 2013/0241488 A1 | 9/2013 | Dao |
| 2019/0081472 A1* | 3/2019 | Guo ..................... H02J 7/0034 |

* cited by examiner

*Primary Examiner* — Hal Kaplan

(57) ABSTRACT

A jumper cable device, comprising an input port, two clamps, a main controller, a clamp polarity detection module and a clamp connection module. The input port is configured to be connected to a startup power source. The clamps are configured to be connected to a battery of a load. The clamp polarity detection module and the clamp connection module are connected to the main controller and the clamps. When the clamps are connected to the battery, the clamp polarity detection module detects polarities of electrodes of the battery to which the two clamps are connected, and the main controller acquires a detection result signal therefrom, control the clamp connection module according to the detection result signal to determine polarities of the two clamps according to the polarities of the electrodes of the battery and connect circuits between the input port and the two clamps to boost the battery.

19 Claims, 10 Drawing Sheets

JUMPER CABLE DEVICE AND JUMP START SYSTEM

CROSS REFERENCE OF RELATED APPLICATIONS

The present application is claims priority of Chinese patent Application No. 202110763309.6 filed on Jul. 6, 2021 and Chinese patent Application No. 202110763308.1 filed on Jul. 6, 2021. The entire contents of the above applications are hereby incorporated by reference.

TECHNICAL FIELD

The present disclosure relates to the technical field of electronics, and particularly to a jumper cable device and a jump start system.

BACKGROUND

Vehicles adopt an ignition system controlled by a microprocessor. The displacement of vehicles is different, so the current, voltage and power required for ignition and startup are also different, so do the under-voltage and damage degree of the batteries on vehicles. Therefore, jumper cables with different functions are produced, such as MOS (Metal-Oxide-Semiconductor Field-Effect Transistor, MOSFET) tube-controlled type, power-diode type, straight-through type, and other types.

However, the jumper cables of the aforesaid types have their own technical defects. For the MOS tube-controlled jumper cables, a plurality of technical defects may appear. For example, it is difficult to enable the vehicles to start with a large displacement and it is prone to burn the MOS tube due to overheating; fail to detect the completion of ignition action even after a successful ignition, the ignition circuit cannot be disconnected and fail to enable the ignition function after a damage of the battery. For the jumper cables controlled by power diode, it is also difficult to start the vehicles with a large displacement, prone to burn the diode due to over temperature and no protection for short circuit; unable to detect the completion of ignition action even after a successful ignition and the ignition circuit cannot be disconnected. For straight-through jumper cables, no reverse connection protection is provided. It will fail to boost the vehicle battery when polarities of the jumper cable are reversely connected to electrodes of the vehicle battery, what is worse, a serious risk may raise due to the reverse connection, for example, a fire may be caused by short circuit.

SUMMARY

The present disclosure provides a jumper cable device and a jump start system, aiming to solve one or more of the above technical problems.

Embodiments of the present disclosure provide a jumper cable device, including an input port, a first clamp and a second clamp, wherein the input port is configured to be connected with an external startup power source, and the first and second clamps are configured to be connected to a battery of a load. The jumper cable device further comprises a main controller, a clamp polarity detection module and a clamp connection module. the main controller is connected to the clamp polarity detection module and the clamp connection module, and the clamp polarity detection module and the clamp connection module are further connected to the first and second clamps. When the first and second clamps are connected to the battery, the clamp polarity detection module is configured to detect polarities of electrodes of the battery to which the two clamps are respectively connected, and the main controller is configured to acquire a detection result signal of the clamp polarity detection module, control the clamp connection module according to the detection result signal to determine polarities of the two clamps according to the polarities of the electrodes of the battery and connect circuits between the input port and the two clamps to boost the battery.

Embodiments of the present disclosure further provide a jump start system, including a startup power source and the above-mentioned jumper cable device, wherein the startup power source includes an output port, and the input port of the jumper cable device is connected to the output port of the startup power source in an insertable manner.

In the jumper cable device according to the embodiments of the present disclosure, the two clamps of no polarity can be connected to the battery according to the polarities of the electrodes of the battery, so that the connection is simplified. Moreover, as the clamps can be connected with the battery without particular polarity requirement, the risk caused by reverse connection is avoided.

BRIEF DESCRIPTION OF THE DRAWINGS

In order to illustrate the technical solutions of the embodiments according to the present application more clearly, drawings used in the description of the embodiments according to the present application will be briefly introduced below. It should be appreciated that the drawings described below merely illustrate some embodiments of the present application, and other drawings may be obtained by those skilled in the art without departing from the scope of the drawings.

DESCRIPTION OF THE EMBODIMENTS

In order to make the inventive objects, features, and advantages of the present disclosure more apparent and understandable, technical solutions in the embodiments of the present disclosure will be described clearly and completely in conjunction with accompanying drawings in the embodiments of the present disclosure. Evidently, the described embodiments are only a part of the embodiments of the present disclosure, but not all the embodiments of the present disclosure. Based on the embodiments of the present disclosure, all other embodiments obtained by those skilled in the art without creative efforts shall fall within a protection scope of the present disclosure.

Figure 1:
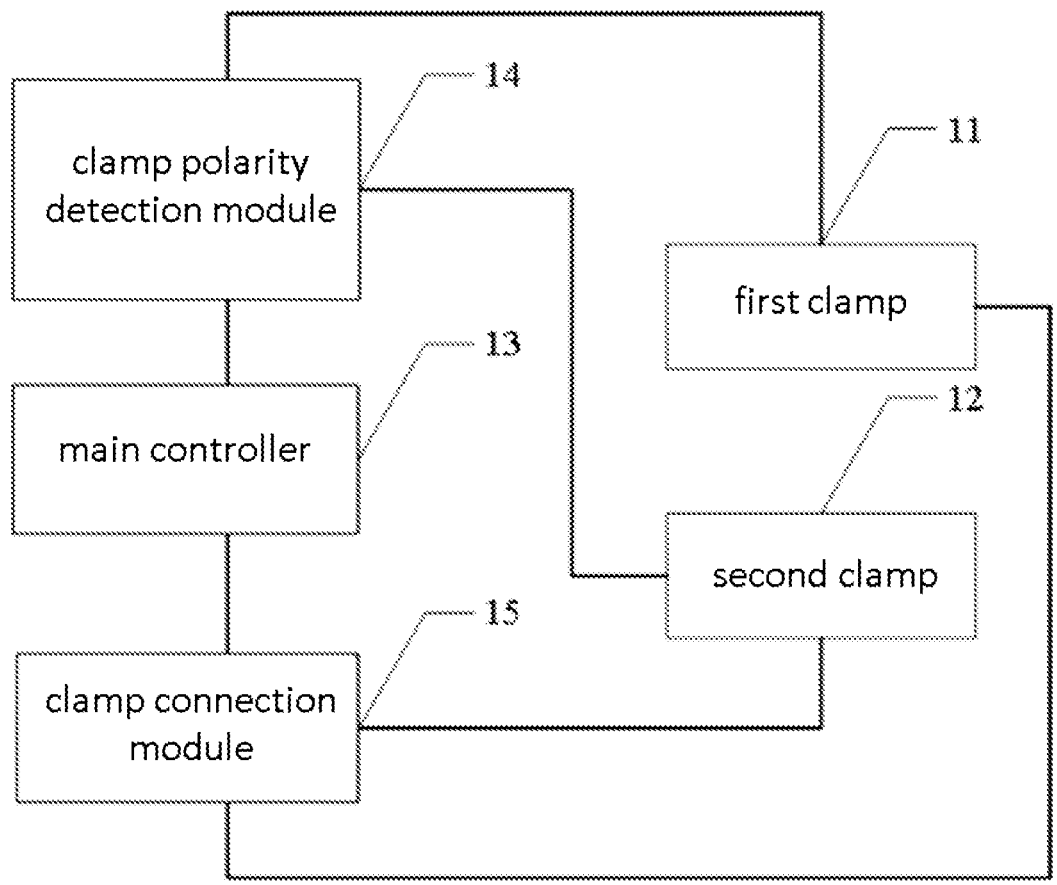
FIG. 1 is a block diagram showing a jumper cable device according to an embodiment of the present disclosure.

Referring to FIG. 1, a jumper cable device according to an embodiment of the present disclosure is shown. The jumper cable device may be used for electronic systems such as vehicles and yachts that require ignition to start. The jumper cable device is configured to connect an external startup power source (for example, a portable power source such as a portable battery) to a battery of the vehicle, the yacht and the like to startup its engine. The jumper cable device will be described in detail below as an example in combination with the ignition of the vehicles. The jumper cable device includes two clamps, i.e., a first clamp 11 and a second clamp 12. The two clamps 11 and 12 are configured to be connected to a battery of a vehicle. The jumper cable device further includes an input port (not shown), which is configured to connect with an output port of the startup power source in an insertable manner to receive power therefrom. The jumper cable device further includes a main controller 13, a clamp polarity detection module 14 and a clamp connection module 15.

Particularly, the main controller 13 includes a main control chip and peripheral circuits. The main control chip is particularly a microcontroller unit (MCU) with a specific model of HT66F018, for example, and having 20 pins.

The main controller 13 is connected to the clamp polarity detection module 14 and the clamp connection module 15. The clamp polarity detection module 14 and the clamp connection module 15 are further connected to the first clamp 11 and the second clamp 12.

The vehicle battery has a positive electrode and a negative electrode. After the jumper cable device have been connected in circuit with the startup power source and the vehicle battery, one of the first clamp 11 and the second clamp 12 is a positive clamp and the other one is a negative clamp. However, before that connection, the first and second clamps 11, 12 are of no polarity. Therefore, when connecting the two clamps according to the embodiment of the present disclosure to the battery, there is no need to identify the polarities of the electrodes of the vehicle battery. That is, for either clamp, there is no predetermined polarity for it before it is connected to the vehicle battery. Accordingly, the clamp may be connected to the positive electrode of the battery, or it may be connected to the negative electrode of the battery. In other words, it is possible that the first clamp 11 is connected to the positive electrode of the battery, and the second clamp 12 is connected to the negative electrode of the battery to boost the battery. It is also possible that the first clamp 11 is connected to the negative electrode of the battery, and the second clamp 12 is connected to the positive electrode of the battery to boost the battery. When the two clamps are connected to the battery, the clamp polarity detection module 14 is configured to detect the polarities of the electrodes of the battery to which the two clamps are respectively connected. That is, it is configured to determine whether each clamp is connected to the positive electrode or the negative electrode of the battery. The main controller 13 is configured to acquire a detection result signal of the clamp polarity detection module 14, and particularly, the detection result signal may be a level signal. Preferably, the detection result signal is a low-level signal.

Figure 2:
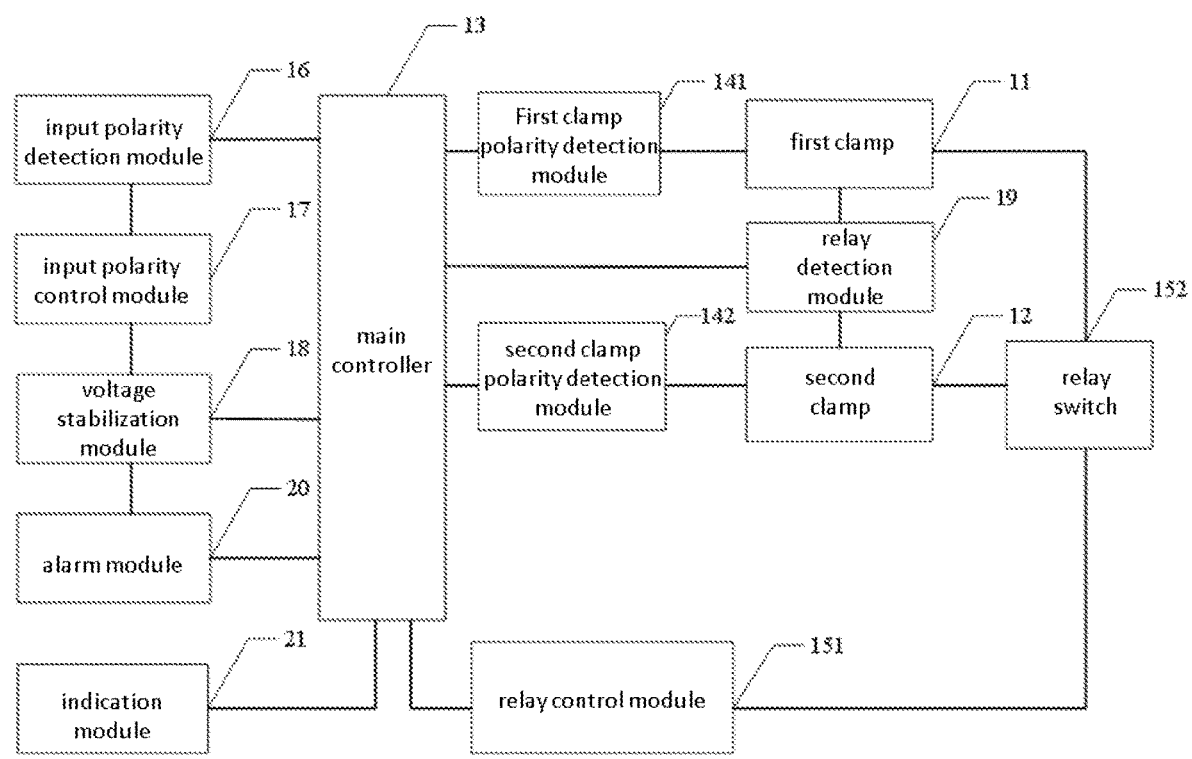
FIG. 2 is a block diagram showing a jumper cable device according to another embodiment of the present disclosure.

Referring to FIG. 2, a jumper cable device according to another embodiment of the present disclosure is shown. Compared with the first embodiment, the clamp polarity detection module 14 of the embodiment particularly includes a first clamp polarity detection module 141 and a second clamp polarity detection module 142. The first clamp polarity detection module 141 and the second clamp polarity detection module 142 are connected to the first clamp 11 and the second clamp 12 respectively, and connected to different pins of the main controller 13 respectively. When the two clamps are connected to the vehicle battery, it is determined that the second clamp 12 is connected to the positive electrode of the battery when a pin of the main controller 13 which is connected to the first clamp polarity detection module 141 detects that a high-level signal is changed to a low-level signal. When a pin of the main controller 13 which is connected to the second clamp polarity detection module 142 detects that the high-level signal is changed to the low-level signal, it is determined that the first clamp 11 is connected to the positive electrode of the battery.

Further, the main controller 13 controls the clamp connection module 15 to determine the expected polarities of the two clamps according to the detected polarities of the electrodes of the vehicle battery to which the two clamps are connected, and connecting each clamp to the respective electrode of the same polarity. That is, the clamp connected to the positive electrode of the battery is determined as the positive clamp, and the clamp connected to the negative electrode of the battery is determined as the negative clamp. Then the circuits between the clamps 11, 12 and electrodes of the startup power source are respectively connected to boost the battery. Accordingly, since the polarities of the clamps in the embodiment of the present disclosure are automatically determined according to the polarities of the electrodes of the battery to which the two clamps are connected, there is no need to confirm whether the clamps have been connected to the electrodes of the battery with correct polarities, simplifying the connection and improving the reliability of the jumper cable device.

In the embodiments of the present disclosure, the jumper cable device includes the input port, the two clamps, the main controller, the clamp polarity detection module and the clamp connection module. The main controller is connected to the clamp polarity detection module and the clamp connection module; the clamp polarity detection module and the clamp connection module are further connected to the two clamps. When the two clamps are connected to the battery, the clamp polarity detection module is configured to detect the polarities of the electrodes of the battery to which the two clamps are respectively connected. The main controller is configured to acquire a detection result signal of the clamp polarity detection module, to control the clamp connection module based on the detection result signal to determine the polarities of the two clamps according to the polarities of the electrodes of the battery, and to connect circuits from the startup power source to the two clamps and thus the battery. Since the polarities of the two clamps are automatically determined according to the polarities of the electrodes of the battery, there is no need to confirm whether the clamps have been connected to the electrodes of the battery with correct polarities. By means of the jumper cable device, the two clamps may be connected to the battery according to the polarities of the electrodes of the battery, so that the connection is simplified. Moreover, as the clamps can be connected with the battery without particular polarity requirement, the risk caused by reverse connection is avoided, the reliability of the jumper cable device is improved, and the service life of the jumper cable device is prolonged.

Still referring to FIG. 2, the jumper cable device further includes an input polarity detection module 16, an input polarity control module 17 and a voltage stabilization module 18. Particularly, the input polarity detection module 16 is connected to the main controller 13. The input polarity detection module 16 includes two electrode terminals connected to the input port. When the input port is inserted into a socket of the startup power source, the two electrode terminals of the input polarity detection module 16 are respectively connected to two electrodes of the startup power source through the input port and thus a level signal is generated. The main controller 13 acquires the level signal by the input polarity detection module 16, and determines the polarities of the electrodes of the startup power source to which the two electrode terminals are respectively connected according to the level signal, and thus to determine the polarities of the two electrode terminals.

The input polarity control module 17 is connected to the input polarity detection module 16 and the voltage stabilization module 18, and the voltage stabilization module 18 is connected to the main controller 13.

The input polarity control module 17 is configured to rectify a power supply input by the input polarity detection module 16 and transmit the rectified power supply to the voltage stabilization module 18. The voltage stabilization module 18 is configured to perform voltage stabilization on the rectified power supply and transmit the resulted power supply to the main controller 13, thereby supplying power to the main controller 13.

In a specific embodiment, the input polarity control module 17 may include two sets of diodes, each set of which includes two diodes. Each of the two electrode terminals is connected to a respective set of diodes, and the two diodes in each set are connected end to end, that is, the positive electrode of one diode is connected to the negative electrode of the other diode. As such, regardless of which polarities of the electrodes of the startup power source to which the electrode terminals are connected, the power can be always supplied to the voltage stabilization module 18 successfully after the rectification of the input polarity control module 17, regardless of the polarities of the electrodes of the startup power source to which the electrode terminals are connected. As a result, the two electrode terminals of the input polarity detection module 16 may be connected to the startup power source randomly, regardless of the positive electrode or the negative electrode, without affecting the supply of power to the main controller 13.

Therefore, based on the foregoing embodiment, the present disclosure further provides a jumper cable device with an input port having two conductive terminals of no polarity requirement.

It should be understood that the conductive terminals of no polarity according to the embodiments of the present disclosure may be used in combination with the clamps of no polarity according to the foregoing embodiments.

Particularly, the clamp connection module 15 includes a plurality of switch control modules and a plurality of switches. In this embodiment, the switches are relay switches, and the switch control modules are relay control modules. In other embodiments, the switches may be MOSs or the like.

The clamp connection module 15 includes a plurality of relay control modules 151 and a plurality of relay switches 152. The plurality of relay control modules 151 are respectively connected to different pins of the main controller 13 in a one-to-one manner, and respectively connected to the plurality of relay switches 152 in a one-to-one manner. The plurality of relay switches 152 are respectively connected to the first clamp 11 and the second clamp 12.

The main controller 13 is configured to control switching-on or switching-off of the relay switches 152 by the plurality of relay control modules 151 according to the polarities of the electrodes of the startup power source to which the two electrode terminals are respectively connected which are detected by the input polarity detection module 16, and the polarities of the electrodes of the battery to which the two clamps are respectively connected which are detected by the clamp polarity detection module 14, so as to connect corresponding circuits between the input port and the battery according to the polarities. That is, the polarities of the two electrode terminals of the input polarity detection module are determined according to the polarities of the electrodes of the connected startup power source, and the polarities of the two clamps are determined according to the polarities of the electrodes of the battery. Circuits between the two electrode terminals and the two clamps (and thus the battery) are connected in such a manner that the positive electrode terminal is connected to the positive clamp, and the negative electrode terminal is connected to the negative clamp.

The jumper cable device further includes a plurality of relay detection modules 19 which are configured to detect whether the relay switches 152 are stuck or not. A stuck state of the relay switches refers to the failure of control of the relay switches, which means statues of the switches may not be changed successfully when being powered on or not. For example, compared to the statues of the relay switches when being energized, the statues of the relay switches when being not energized do not change.

Particularly, each of the relay detection modules 19 includes first and second diodes, a triode and first and second resistors. A positive electrode of the first diode is connected to a pin of the main controller 13 and a collector of the triode, and the negative electrode of the first diode is connected to a fifth pin of a relay switch to be detected. A base of the triode is connected to first ends of the two resistors. A second end of the first resistor is connected to the negative electrode of the second diode, and a positive electrode of the second diode is connected to a first pin of the relay switch.

When the pin of the main controller 13 detects that the level signal is changed to a high-level signal, it is determined that the relay switch to which the pin is connected is stuck.

The jumper cable device further includes an alarm module 20 and an indication module 21.

The alarm module 20 is connected to the main controller 13 and the voltage stabilization module 18. The alarm module 20 includes a buzzer which is configured to perform a buzzer alarm according to an instruction from the main controller 13.

The indication module 21 is connected to the main controller. The indication module 21 may include two light emitting diodes with different light colors, which are configured to be turned on or off according to the instruction from the main controller 13 to perform light indication. The light colors of the two light emitting diodes are not limited, provided that normality and abnormality can be shown differently.

The jumper cable device further includes a startup power communication module.

The startup power communication module includes a DATA-1 network and a resistor R11. The DATA-1 network is connected to a pin of the main controller, and connected to one end of the resistor R11. The other end of the resistor R11 is grounded. The startup power communication module is configured for communication between the main controller and the startup power source. When the startup power source is failure, a failure signal may be transmitted to the main controller through the DATA-1 network, and the main controller outputs an alarm signal to the alarm module for making a corresponding alarm prompt and/or outputting an indication signal to the indication module for prompting the abnormality. Particularly, the failure signal may include a signal indicating that the voltage of the startup power source is too low, that is, lower than a threshold; and/or a signal indicating that the temperature of the startup power source is too high, that is, higher than a threshold.

Figure 3:
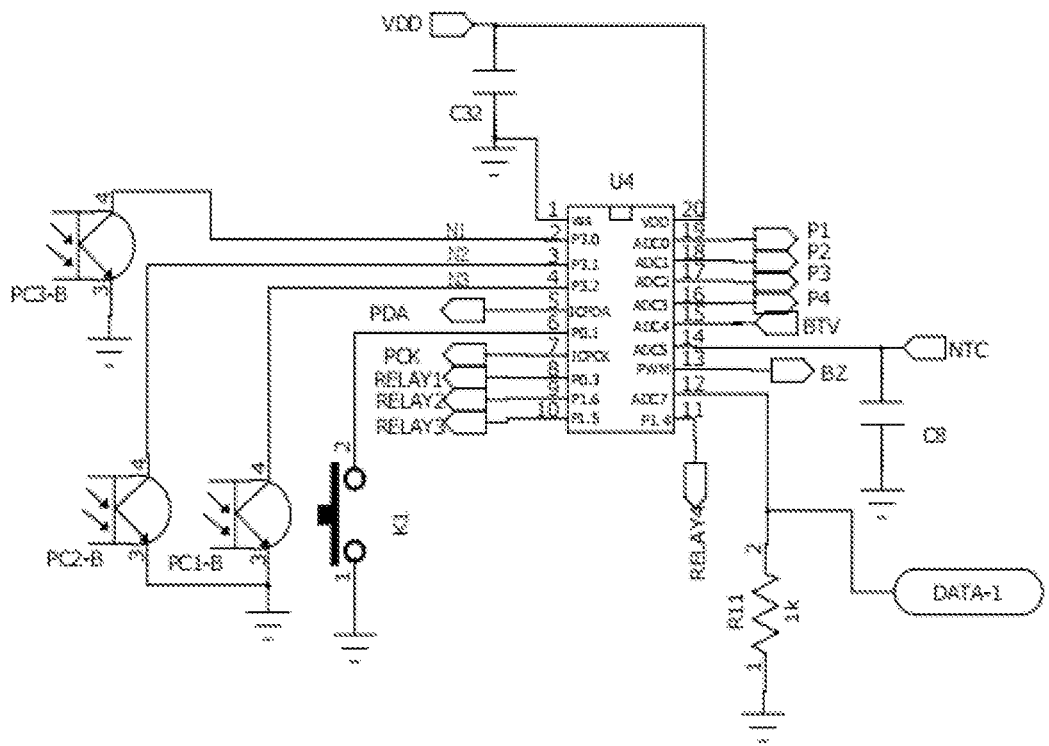
FIG. 3 is a schematic diagram showing a structure and a circuit configuration of a main controller of a jumper cable device according to an embodiment of the present disclosure.

Referring to FIG. 3, a structure and a circuit configuration of a connection relationship of the main controller of the jumper cable device is shown. The main controller includes a chip U4. A second pin of the chip U4 is connected to the input polarity detection module 16. A third pin and a fourth pin of the chip U4 are respectively connected to the first clamp polarity detection module 14 and the second clamp polarity detection module 142. An eighth pin through an eleventh pin of the chip U4 are respectively connected to four relay control modules 141. A twelfth pin of the chip U4 is connected to the DATA-1 network of the power communication module. A sixteenth pin through a nineteenth pin of the chip U4 are respectively connected to four relay detection modules 19. A thirteenth pin of the chip U4 is connected to the alarm module 20. The fifth pin and the seventh pin of the chip U4 are respectively connected to two indication modules 21. Further, a fourteenth pin of the main controller chip U4 may be connected to a temperature detection module, and the temperature detection module is configured to detect a temperature of a main body of the jumper cable device. A fifteenth pin of the chip U4 may be connected to a voltage detection module, and the voltage detection module is configured to detect an input voltage of the jumper cable device (that is, a voltage of the startup power source) and a real-time ignition voltage. The temperature detection module and the voltage detection module may be implemented by known means of the prior art, which will not be described in detail herein.

Figure 4:
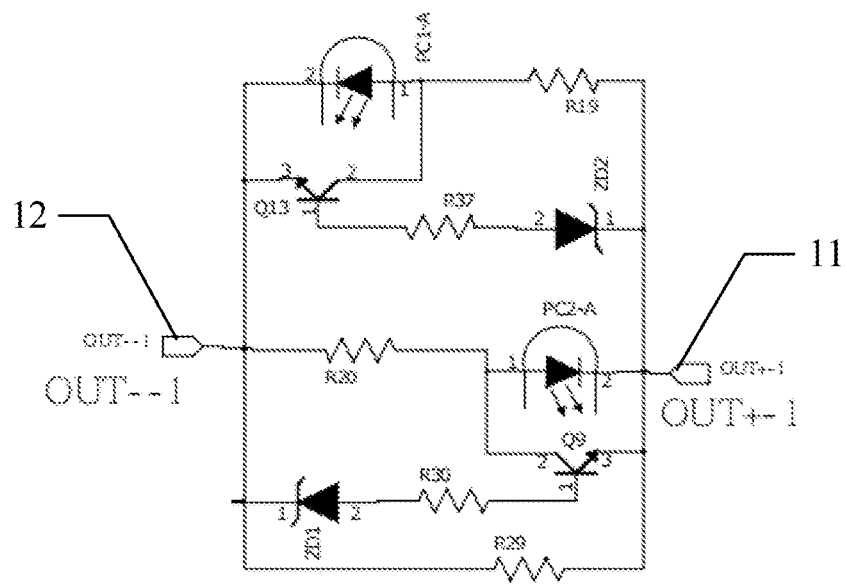
FIG. 4 is a schematic diagram showing a structure and a circuit configuration of a clamp polarity detection module of a jumper cable device according to an embodiment of the present disclosure.

Particularly, referring to FIG. 4, which is a schematic diagram showing a structure and a connection structure of the clamp polarity detection module 14, the clamp polarity detection module 14 includes a first clamp polarity detection module and a second clamp polarity detection module. The first clamp polarity detection module includes a first optocoupler PC1 and a first resistor R19, and the second clamp polarity detection module includes a second optocoupler PC2 and a second resistor R20.

The first optocoupler PC1 includes four pins, i.e., first to fourth pins, wherein the first and second pins are on a PC1-A side, and the third and fourth pins are on a PC1-B side. The PC1-A side and the PC1-B side may be integrated to form a complete first optocoupler PC1. The second optocoupler PC2 includes four pins, i.e., first to fourth pins, wherein the first and second pins are on a PC2-A side, and the third and fourth pins 3 to 4 are on a PC2-B side. The PC2-A side and the PC2-B side may be integrated into a complete second optocoupler PC2.

The first pin of the first optocoupler PC1 is connected to one end of a first resistor R19. The other end of the first resistor R19 is connected to the first clamp 11. The second pin of the first optocoupler PC1 is connected to the second clamp 12. The third pin of the first optocoupler PC1 is grounded. The fourth pin of the first optocoupler PC1 is connected to a fourth pin of the main controller, that is, the pin 4 of the main controller chip U4.

The first pin of the second optocoupler PC2 is connected to one end of a second resistor R20. The other end of the second resistor R20 is connected to the second clamp 12. The second pin of the second optocoupler PC2 is connected to the first clamp 11. The third pin of the second optocoupler PC2 is grounded. The fourth pin of the second optocoupler PC2 is connected to a third pin of the main controller, that is, the pin 3 of the main controller chip U4.

Identification of output polarities of the clamps: when the third pin of the main controller chip detecting that the level signal is a low-level signal, it is confirmed that a positive electrode of the battery is connected to the OUT-1; and when the fourth pin of the main controller chip detecting that the level signal is a low-level signal, it is confirmed that the positive electrode of the battery is connected to the OUT+-1.

Figure 5A:
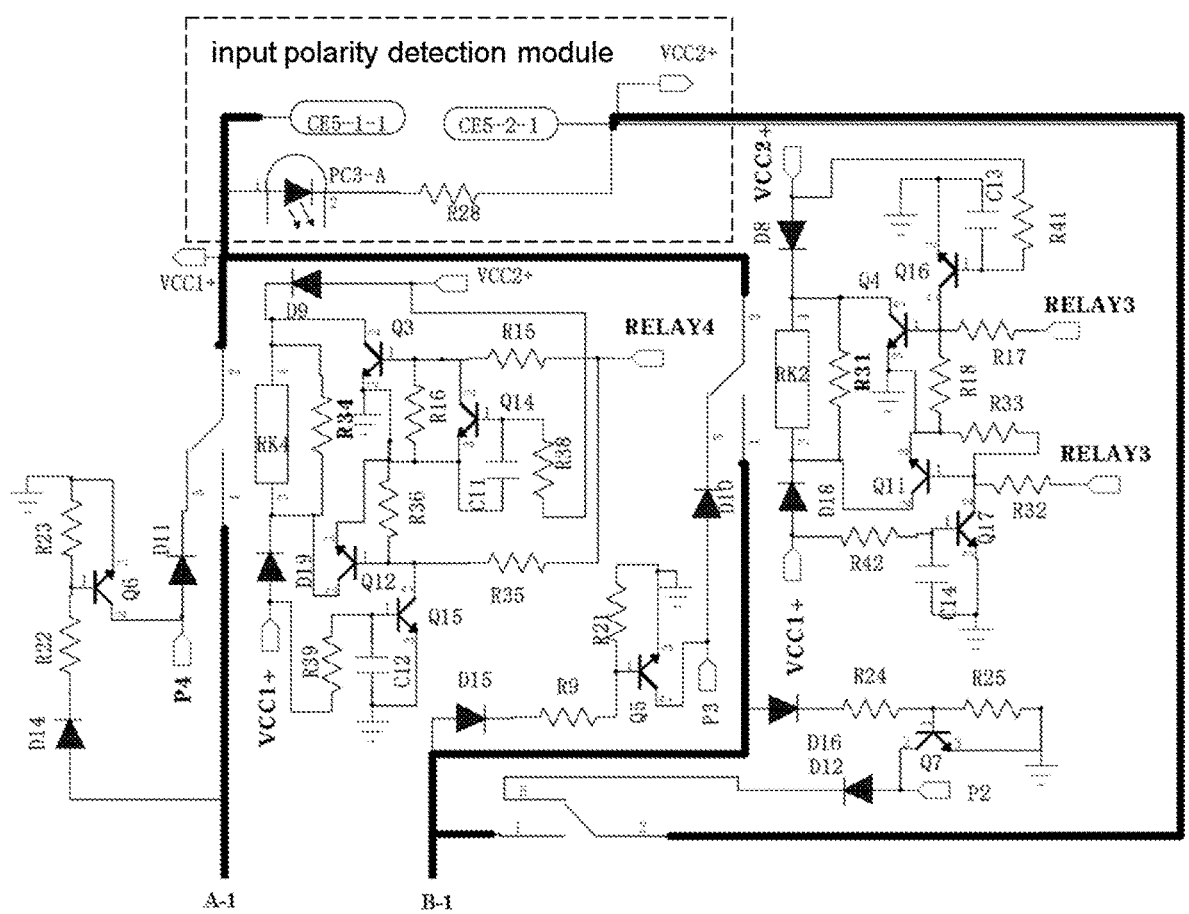
FIG. 5A is a schematic diagram showing structures and circuit configurations of a portion of an input polarity detection module, a clamp connection module and a relay detection module of a jumper cable device according to an embodiment of the present disclosure.
Figure 5B:
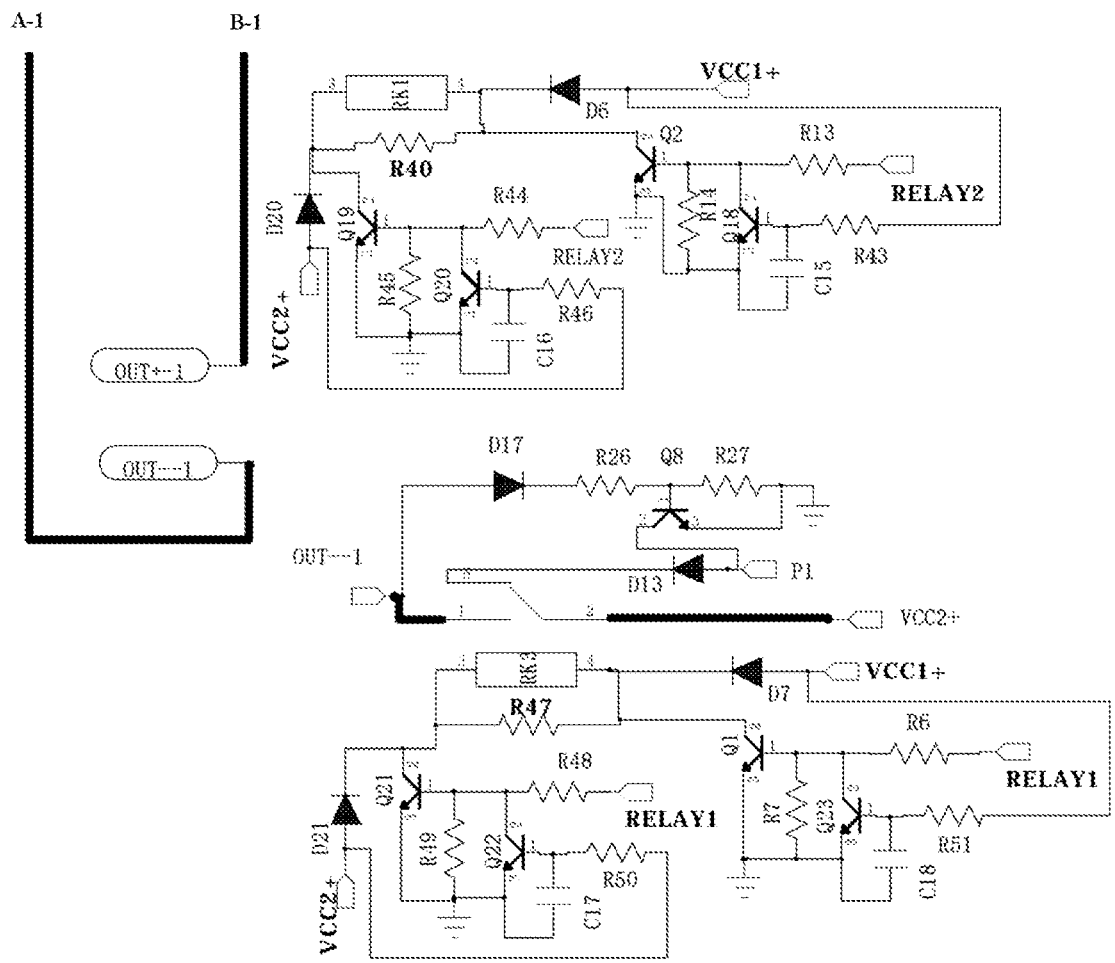
FIG. 5B is a schematic diagram showing structures and circuit configurations of the remaining portion of the input polarity detection module, the clamp connection module and the relay detection module of the jumper cable device according to the embodiment of FIG. 5A.
Figure 6:
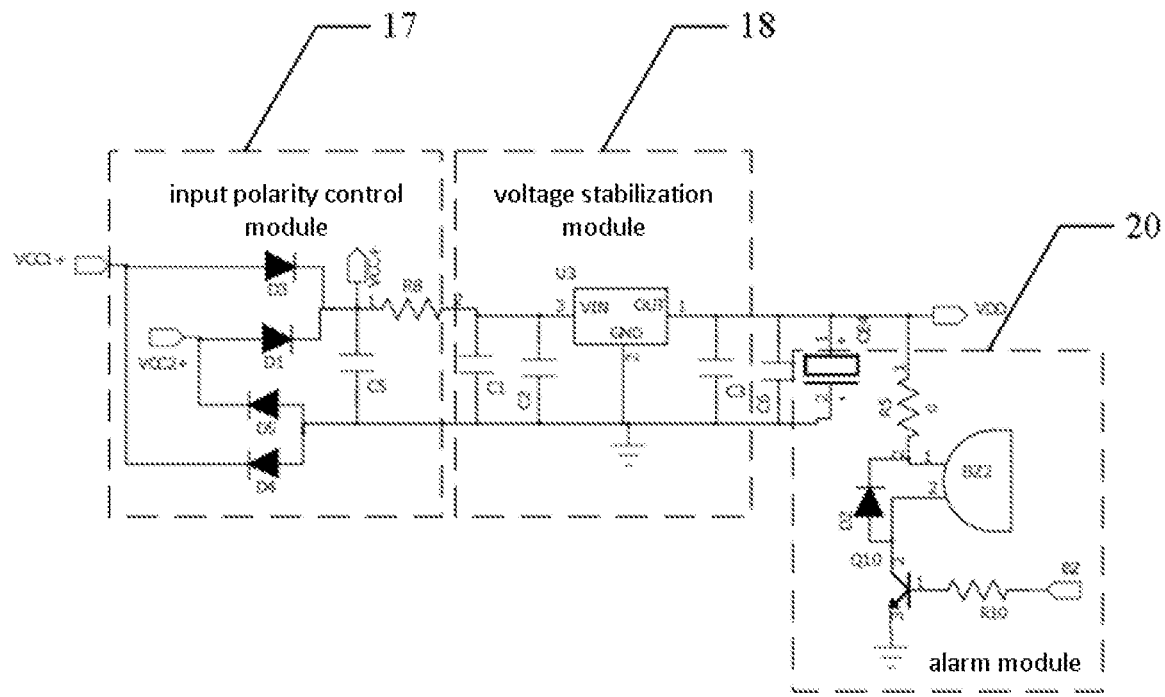
FIG. 6 is a schematic diagram showing structures and circuit configurations of an input polarity control module, a voltage stabilization module and an alarm module of a jumper cable device according to an embodiment of the present disclosure.

With reference to FIGS. 5A, 5B and FIG. 6, FIGS. 5A and 5B are schematic diagrams showing structures and circuit configurations of connection relationships of the input polarity detection module 16, the clamp connection module and the relay detection module of the jumper cable device. FIG. 6 is a schematic diagram showing structures and circuit configurations of connection relationships of the polarity control module 17, the voltage stabilization module 18 and the alarm module 20. The input polarity detection module 16 includes a first electrode terminal CE5-1-1, a second electrode terminal CE5-2-1, a third optocoupler PC3 and a third resistor R28. The first electrode terminal CE5-1-1 and the second electrode terminal CE5-2-1 are respectively connected to two conductive terminals of the input port. The input polarity control module 17 includes a first diode D3, a second diode D4, a third diode D1, a fourth diode D5 and a fourth resistor R8. The voltage stabilization module 18 includes a voltage stabilization chip U3.

Particularly, the third optocoupler PC3 includes four pins, i.e., the first to fourth pins, wherein the first and second pins are on a PC3-A side, and the third and fourth pins are on a PC3-B side. A model of the above-mentioned diodes is preferably IN4148.

The first pin of the third optocoupler PC3 is connected to a first electrode terminal CE5-1-1, and connected to a positive electrode of the first diode D3 and a negative electrode of the second diode D4. The second pin of the third optocoupler PC3 is connected to a second electrode terminal CE5-2-1, and connected to a positive electrode of a third diode D1 and a negative electrode of a fourth diode D5. The third pin of the third optocoupler PC3 is grounded, and the fourth pin of the third optocoupler PC3 is connected to a second pin of the main controller, that is, the pin 2 of the main controller chip U4.

A negative electrode of the first diode D3 and a negative electrode of the third diode D1 are connected to an input of the voltage stabilization chip U3 through the fourth resistor R8. An output of the voltage stabilization chip U3 is connected to a twentieth pin of the main controller, that is, the pin 20 of the main controller chip U4.

Identification of input polarities: when the startup power source is connected to the input port, if the second pin of the main controller detects that the level signal is a low-level signal, then it is determined that the first electrode terminal CE5-1-1 is connected to the positive electrode of the startup power source, and the second electrode terminal CE5-2-1 is connected to the negative electrode of the startup power source; and if the second pin of the main controller detects that the level signal is a high-level signal, then it is determined that the first electrode terminal CE5-1-1 is connected to the negative electrode of the startup power source, and the second electrode terminal CE5-2-1 is connected to the positive electrode of the startup power source.

The two electrode terminals in the input port are of no polarity requirement, the input polarity detection module is capable of automatically identifying the polarities of the electrodes of the startup power source to which the two electrode terminals are connected, as such, there is no need to confirm the positive electrode and the negative electrode when the input port is inserted into the startup power source. Accordingly, misoperation is prevented and the power supply success rate is increased.

The first diode D3 and the second diode D4 in the input polarity control module are connected to the first electrode terminal CE5-1-1 with opposite polarities, and the third diode D1 and the fourth diode D5 are connected to the second electrode terminal CE5-2-1 with opposite polarities, such that the power supply signal output by the CE5-1-1 and the CE5-2-1 may always be transmitted to the voltage stabilization module through these four diodes to be stabilized, so as to achieve stabilized power supply to the main controller.

Further, the clamp connection module includes four relay control modules and four relay switches. The four relay control modules include a first relay control module, a second relay control module, a third relay control module and a fourth relay control module, which are respectively connected to the four relay switches and respectively connected to the eighth pin through the eleventh pin of the U4, that is, RELAY 1 to 4 as shown in the drawing. The four relay switches include a first relay switch RK3, a second relay switch RK1, a third relay switch RK2 and a fourth relay switch RK4. Each relay switch has 5 pins such as first to fifth pins as shown in FIGS. 5A and 5B.

Each of the relay control modules includes two relay control sub-modules. Each of the relay control sub-modules includes at least one resistor and one triode. One end of the resistor is connected to a pin of the main controller and the other end thereof is connected to a base of the triode. A collector of the triode is connected to a pin of the relay switch.

Particularly, as shown in FIG. 5B, the first relay control module includes a first relay control sub-module and a second relay control sub-module. The first relay control sub-module at least includes a resistor R6 and a triode Q1, and further includes resistors R7 and R51, a capacitor C18 and a triode Q23. One end of the resistor R6 is connected to an eighth pin of the main controller U4 and the other end thereof is connected to a base of the triode Q1. A collector of the triode Q1 is connected to a fourth pin of the first relay switch RK3, that is, the pin 4 of the RK3 in FIG. 5B. The second relay control submodule at least includes a resistor R48 and a triode Q21, and further includes resistors R49 and R50, a capacitor C17 and a triode Q22. One end of the resistor R48 is connected to an eighth pin of the U4 of the main controller and the other end thereof is connected to a base of the triode Q21. A collector of the triode Q21 is connected to a third pin of the first relay switch RK3, that is, the pin 3 of the RK3 in FIG. 5B.

The structures and the connections of the second relay control module, the third relay control module and the fourth relay control module are similar to those of the first relay control module. Specific structures and connections are shown in FIGS. 5A and 5B and will not be described in detail herein.

The first clamp 11 is connected to a first pin of the second relay switch RK1 (i.e., the pin 1 of the RK1) and a first pin of the third relay switch RK2 (i.e., the pin 1 of the RK2). The second clamp 12 is connected to a first pin of the first relay switch RK3 (i.e., the pin 1 of the RK3) and a first pin of the fourth relay switch RK4 (i.e., the pin 1 of the RK4).

Based on the detection results of the input polarity detection module and the clamp polarity detection module, the main controller controls the four relay control modules to control switching-on or switching-off of the four relay switches, so as to respectively connect the two electrode terminals to the two clamps and thus to the battery according to the polarities of the electrodes of the startup power source connected with the input port and the polarities of the electrodes of the battery to which the two clamps are connected in such a manner that the electrode terminal and the clamp of the same polarity should be connected.

Particularly, a first case is described as below. When the main controller chip U4 detects a low-level signal at the second pin, a low-level signal at the third pin, and a high-level signal at the fourth pin, according to the above-mentioned method for determining the polarities, it can be determined that the first electrode terminal CE5-1-1 is connected to the positive electrode of the startup power source, and the second clamp OUT--1 is connected to the positive electrode of the battery. Then the main control chip controls the second relay control module and the fourth relay control module to respectively switch on the relay switches RK1 and RK4, such that the CE5-1-1 and the OUT--1 are connected, and the CE5-2-1 and the OUT+-1 are connected.

A second case is described as below. When the main controller chip U4 detects a low-level signal at the second pin, a low-level signal at the third pin, and a high-level signal at the fourth pin, according to the above-mentioned method for determining the polarities, it can be determined that the first electrode terminal CE5-1-1 is connected to the positive electrode of the startup power source, and the first clamp OUT+-1 is connected to the positive electrode of the battery. Then the main control chip controls the first relay control module and the third relay control module to respectively switch on the relay switches RK3 and RK2, such that the CE5-1-1 and the OUT+-1 are connected, and the CE5-2-1 and the OUT--1 are connected.

A third case is described as below. When the main controller chip U4 detects a low-level signal at the second pin, a high-level signal at the third pin, and a high-level signal at the fourth pin, it means that the clamps are not connected to the battery, or indicates failure of the clamps or failure of the battery, the main control chip does not switch on any relay switch, and the startup power source is not connected to the battery.

A fourth case is described as below. When the main controller chip U4 detects a high-level signal at the second pin, a low-level signal at the third pin, and a high-level signal at the fourth pin, according to the above-mentioned method for determining the polarities, it can be determined that the second electrode terminal CE5-2-1 is connected to the positive electrode of the startup power source, and the second clamp OUT−-1 is connected to the positive electrode of the battery. Then the main control chip controls the first relay control module and the third relay control module to respectively switch on the relay switches RK3 and RK2, such that the CE5-2-1 and the OUT−-1 are connected, and the CE5-1-1 and the OUT+-1 are connected.

A fifth case is described as below. When the main controller chip U4 detects a high-level signal at the second pin, a high-level signal at the third pin, and a low-level signal at the fourth pin, according to the above-mentioned method for determining the polarities, it can be determined that the second electrode terminal CE5-2-1 is connected to the positive electrode of the startup power source, and the first clamp OUT+-1 is connected to the positive electrode of the battery. Then the main control chip controls the second relay control module and the fourth relay control module to respectively switch on the relay switches RK1 and RK4, such that the CE5-2-1 and the OUT+-1 are connected, and the CE5-2-1 and the OUT−-1 are connected.

A sixth case is described as below. When the main controller chip U4 detects a high-level signal at the second pin, a high-level signal at the third pin, and a high-level signal at the fourth pin, it means that the clamps are not connected to the battery, or indicates failure of the clamps or failure of the battery, the main control chip does not switch on any relay switch, and the startup power source is not connected to the battery.

Further, the first relay control sub-module and the second relay control sub-module simultaneously function as two magnetic field polarity switching modules.

Further, the jumper cable device further includes four relay detection modules, i.e., P1 to P4 in FIGS. 5A and 5B, which are connected to a sixteenth pin through a nineteenth pin of the main controller chip U4, and configured to detect whether the four relay switches are stuck or not.

Each relay detection module includes two diodes, a triode and two resistors. A positive electrode of one diode is connected to a pin of the main controller and a collector of a triode, and a negative electrode of the diode is connected to a fifth pin of the relay switch to be detected. A base of the triode is connected to first ends of the two resistors. The second end of one of the resistors is connected to the negative electrode of the other diode. A positive electrode of the other diode is connected to the first pin of the relay switch. The four relay detection modules include diodes D10 to D17, triodes Q5 to Q8, and resistors R9, R21 to R27.

Particularly, the first relay detection module includes diodes D13 and D17, a triode Q8 and resistors R26 and R27. A negative electrode of the diode D13 is connected to the fifth pin of the first relay switch PK3 (that is, the pin 5 of the PK3), and the positive electrode of the diode D13 is connected to a collector of the triode Q8. A base of the triode Q8 is connected to first ends of the resistors R26 and R27. The second end of the resistor R26 is connected to the negative electrode of the diode D17, and the second end of the resistor R27 is grounded. A positive electrode of the diode D17 is connected to the first pin of the first relay switch PK3 (i.e., the pin 1 of the PK3).

The second relay detection module includes diodes D12 and D16, a triode Q7 and resistors R24 and R25, connection relationships of which are shown in FIG. 5A, which are the same as those of the first relay detection module, and will not be repeated herein.

The third relay detection module includes diodes D10 and D15, a triode Q5 and resistors R9 and R21, connection relationships of which are shown in FIG. 5A, which are the same as those of the first relay detection module, and will not be repeated herein.

The fourth relay detection module includes diodes D11 and D14, a triode Q6 and resistors R22 and R23, connection relationships of which are shown in FIG. 5A, which are the same as those of the first relay detection module, and will not be repeated herein.

When the main controller detecting that the level signal at anyone of the four pins which are respectively connected to the four relay detection modules is changed to the high-level signal, it is determined that the corresponding relay switch connected thereto is stuck.

By taking the first relay detection module and the first relay switch RK3 as an example, when the first relay switch RK3 is not powered, the second pin (i.e., the pin 2 of the RK3 in FIG. 5B) and the fifth pin (the fifth pin of the RK3) are connected. However, by this time, if the second pin of the RK3 (i.e., the pin 2 of the RK3) and the first pin (i.e., the pin 1 of the RK3) are connected, the first relay switch RK3 does not disconnect, that is, the first relay switch RK3 and the fifth pin are not disconnected, it is determined that the first relay switch PK3 is stuck.

The alarm module 20 shown in FIG. 6 is connected to the main controller and the voltage stabilization module 18. The alarm module 20 includes a buzzer BZ2, which is connected to a thirteenth pin of the main controller chip U4, and configured to perform a buzzer alarm according to an instruction from the main controller.

Figure 7:
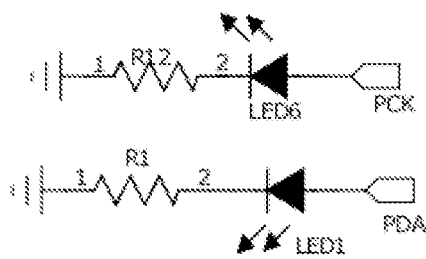
FIG. 7 is a schematic diagram showing a structure and a circuit configuration of an indication module of a jumper cable device according to an embodiment of the present disclosure.

Referring to FIG. 7, a structure and a circuit configuration of a connection relationship of the indication module of the jumper cable device is shown. The indication module is connected to the fifth pin and the seventh pin of the main controller chip U4. The indication module includes two light emitting diodes LED1 and LED6 with different light colors, which are configured to be turned on or off according to the instruction from the main controller to perform light indication. Turning on one of the light emitting diodes indicates that a failure occurs, and turning on the other light emitting diode indicates that the circuit is normal.

In the embodiments of the present disclosure, the jumper cable device includes the input port, the two clamps, the main controller, the input polarity detection module, the input polarity control module, the clamp polarity detection module and the clamp connection module. The main controller is connected to the input polarity detection module, the clamp polarity detection module and the clamp connection module. The jumper cable device can be connected to the startup power source to supply power to the main controller without particular polarity requirement by the input polarity detection module and the input polarity control module. The clamp polarity detection module and the clamp connection module are further connected to the two clamps. When the two clamps are connected to the battery, the clamp polarity detection module is configured to detect the polarities of the electrodes of the battery to which the two clamps are respectively connected. The main controller is configured to acquire a detection result signal of the clamp polarity detection module, to control the clamp connection module according to the detection result signal to determine the polarities of the two clamps according to the polarities of the electrodes of the battery, and to connect circuits from the startup power source to the battery. Since the polarities of the two clamps are automatically determined according to the polarities of the electrodes of the battery, there is no need to confirm whether the clamps have been connected to the electrodes of the battery with correct polarities.

Figure 8:
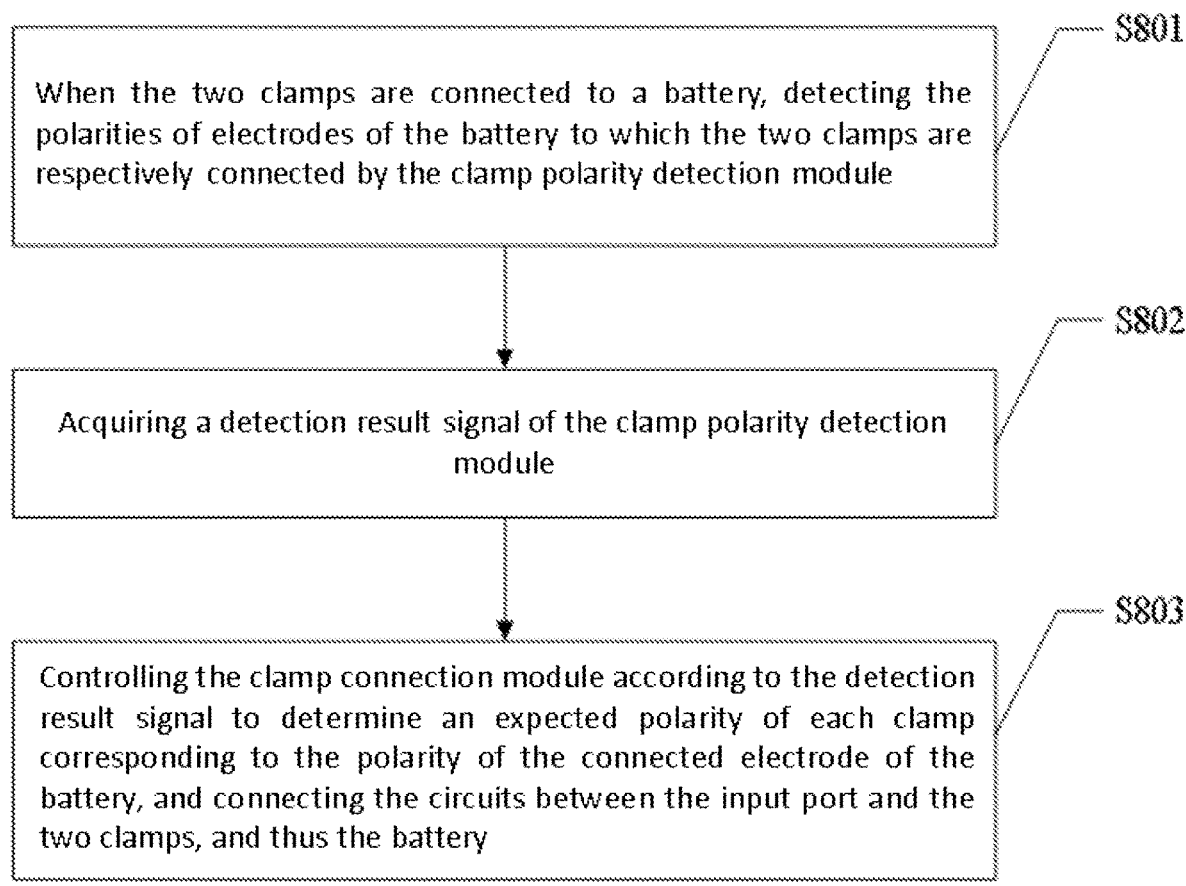
FIG. 8 is a flow chart of an ignition control method according to an embodiment of the present disclosure.

Referring to FIG. 8, it is a flowchart of a startup control method according to an embodiment of the present disclosure. The control method is performed by using the above-mentioned jumper cable device. The jumper cable device includes an input port and two clamps, and further includes a main controller, a clamp polarity detection module and a clamp connection module. The main controller is connected to the clamp polarity detection module and the clamp connection module. The clamp polarity detection module and the clamp connection module are connected to the two clamps. For a specific structure, a connection, and a working principle, reference can be made to the descriptions of the foregoing embodiments.

As shown in FIG. 8, the control method is executed by a main control module. The method may be implemented by executing a specific computer program through the main control chip of the main control module. The method may include the following steps.

S801: when the two clamps are connected to a battery, detecting the polarities of the electrodes of the battery to which the two clamps are respectively connected by the clamp polarity detection module;

S802: acquiring a detection result signal of the clamp polarity detection module; and S803: controlling the clamp connection module according to the detection result signal to determine the expected polarity of each clamp corresponding to the polarity of the connected electrode of the battery, and connecting the circuits between the input port and the two clamps, and thus the battery.

For the details of the above steps, reference may be made to relevant descriptions of the foregoing embodiments, which will not be described in detail herein.

In the embodiments of the present disclosure, the jumper cable device is used to boost the battery for ignition. When the two clamps are connected to the battery, the clamp polarity detection module detects the polarities of the electrodes of the battery to which the two clamps are respectively connected. The main controller acquires the detection result signal of the clamp polarity detection module, and controls the clamp connection module according to the detection result signal to determine polarity of each clamp according to the polarity of the connected electrode of the battery, and switches on circuits from the startup power source to the two clamps and the battery. Since the polarities of the two clamps are automatically determined corresponding to the polarities of the electrodes of the battery, there is no need to confirm whether the clamps have been connected to the corresponding electrodes of the battery with correct polarities. By means of the jumper cable device, the two clamps may be connected to the battery according to the polarity of the battery, so that the successful ignition can be achieved, and the ignition success rate of the clamps is increased. Moreover, since there is no specific polarity requirement when connecting the clamps to the battery, risk of reverse connection is avoided, and thus the service life of the jumper cable device is prolonged.

Embodiments of the present disclosure further provide a jump start system, which includes a startup power source and a jumper cable device connected to the startup power source. The jumper cable device may be any one according to the embodiments described above. The startup power source is preferably a portable power source, such as a portable battery.

Figure 9:
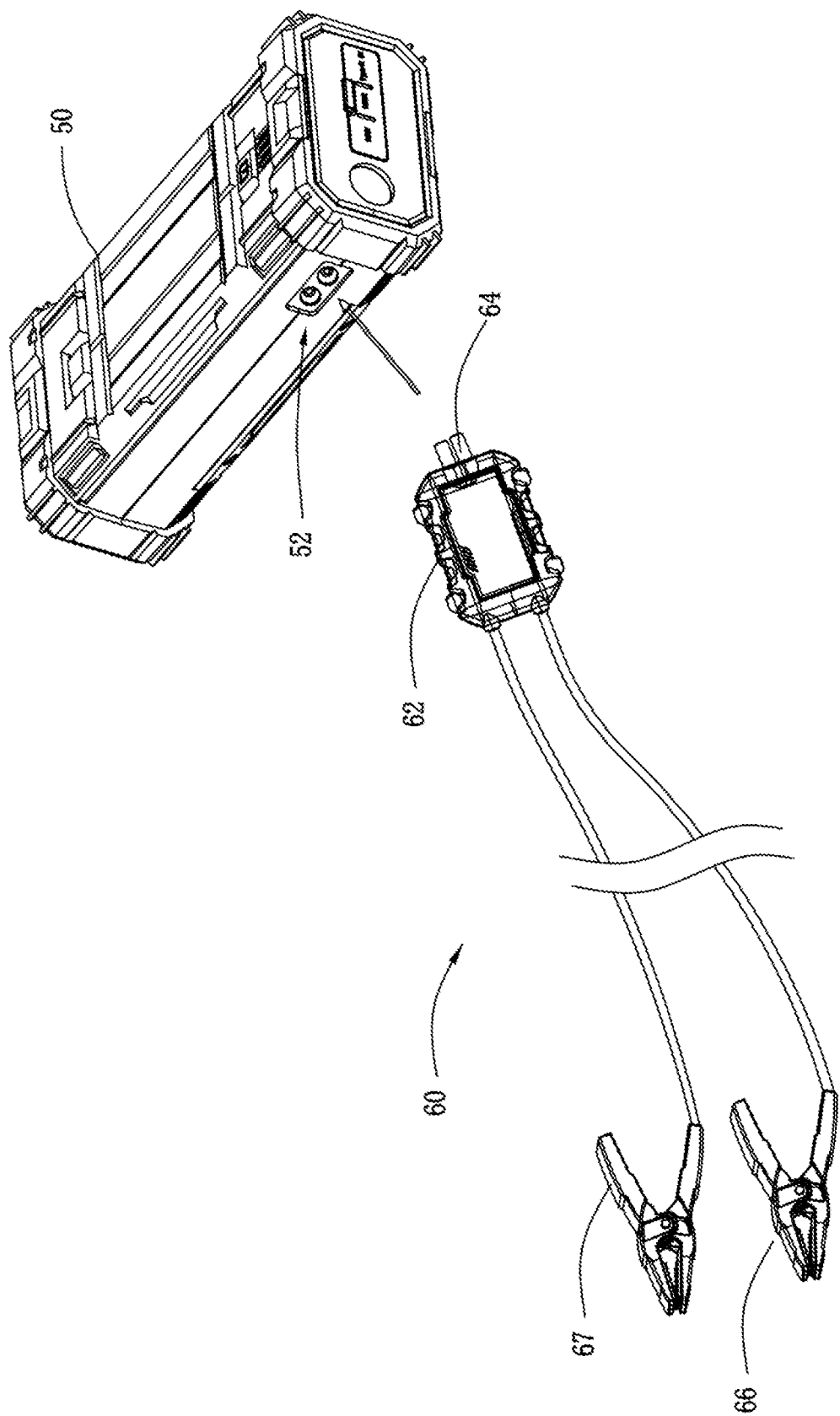
FIG. 9 is a perspective view showing a jump start system according to an embodiment of the present disclosure.

FIG. 9 is a perspective view showing a jump start system according to an embodiment of the present disclosure. The jump start system includes a startup power source 50 and a jumper cable device 60. The startup power source 50 is provided with an output port 52.

The jumper cable device 60 includes a main body 62, an input port 64 connected to the main body 62, a first clamp 66 and a second clamp 67. The input port 64 of the jumper cable device 60 may be connected to the output port 52 of the startup power source 50 in an insertable manner and thus electrically connected thereto. Particularly, the input port and the output port are a first connector and a corresponding second connector.

Figure 10:
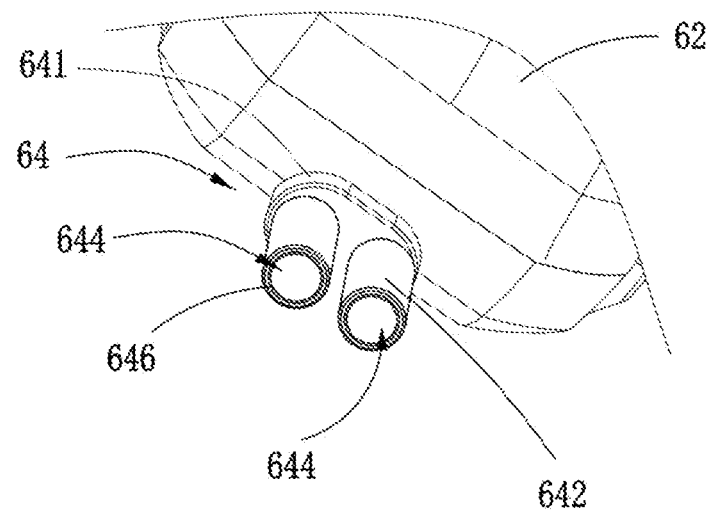
FIG. 10 is a partial enlarged view showing a jumper cable device of the jump start system shown in FIG. 9.
Figure 11:
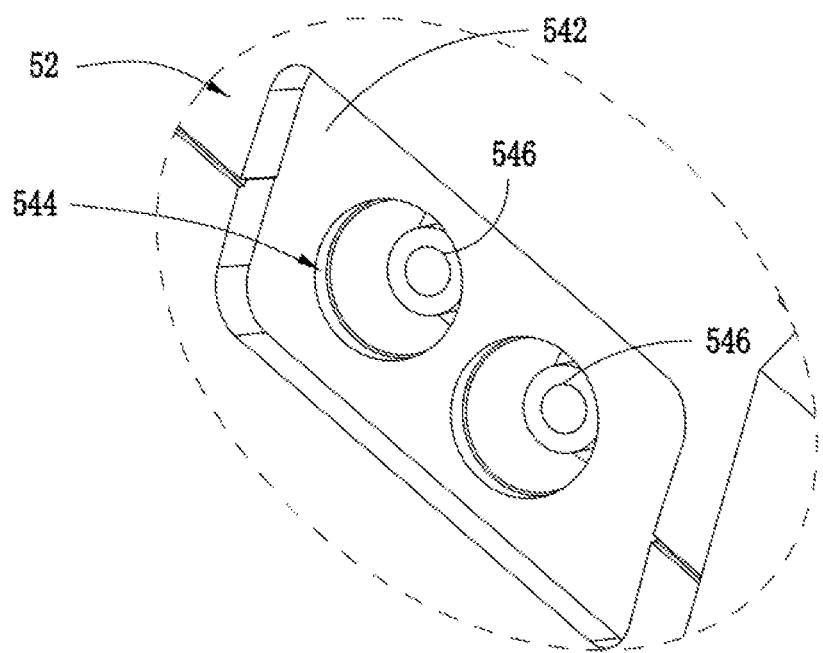
FIG. 11 is a partial enlarged view showing a startup power source of the jump start system shown in FIG. 9.

With reference to FIG. 10 and FIG. 11, the input port 64 of the jumper cable device 60 is configured as a plug, which includes a first base 641 having at least one insertion portion 642. In this embodiment, two insertion portions 642 are provided, which are spaced apart. The insertion portions 642 are cylindrical, and each insertion portion 642 is provided with a first hole 644 and a conductive terminal 646 attached to an inner wall of the first hole 644. In this embodiment, the conductive terminal 646 is annular. Accordingly, the output port 52 of the startup power source 50 is configured as a socket, which includes a second base 542, provided with at least one second hole 544 therein and two power terminals disposed within the second hole 544. In this embodiment, two second holes 544 are provided which are spaced apart from each other, and the power terminals 546 both are cylindrical. One of the two power terminals 546 is a positive terminal and the other one is a negative terminal.

During connection, the two insertion portions 642 of the first base 641 of the input port 64 are respectively inserted into the second holes 544 of the output port 52, and the two power terminals 546 of the output port 52 are respectively inserted into the two first holes 644 of the input port 64 and respectively in contact with the conductive terminals 646 therein, so as to establish an electrical connection therebetween. Preferably, an insertion end 642 of the input port 64 is at least partially form-fitting with the second hole 544, such that it is adaptable for being inserted into the second hole 544.

As shown, the input port 64 of the jumper cable device 60 according to the present disclosure has a symmetrical structure at its outer periphery. Correspondingly, the output port 52 of the startup power source 50 has a symmetrical structure at its inner periphery. Therefore, the input port 64 of the jumper cable device 60 can be inserted into the output port 52 of the startup power source 50 in a front direction (a first direction), and the input port 64 of the jumper cable device 60 can also be inserted into the output port 52 of the startup power source 50 in a back direction (a second direction), both of which can realize that the two conductive terminals 646 of the jumper cable device 60 and the two power terminals 546 of the startup power source 50 are respectively electrically connected. Namely, the input port 64 of the jumper cable device 60 can be inserted into the output port 52 of the startup power source 50 in a direction as shown in the Figure, the input port 64 of the jumper cable device 60 can also be inserted into the output port 52 of the startup power source 50 in an opposite direction (i.e., the input port 64 of the jumper cable device 60 shown in the Figure is rotated for 180 degrees about an axis parallel to the insertion direction). In other words, there is no requirement on an insertion direction of the input port 64 of the jumper cable device 60. The two conductive terminals are of no polarity. Either conductive terminal can be connected to the positive terminal of the startup power source 50, and can also be connected to the negative terminal of the startup power source 50, regardless of the polarity of the two conductive terminals.

In this embodiment, the two insertion portions 642 of the input port 64 of the jumper cable device 60 are spaced apart. In other embodiments, the two insertion portions may be connected and form as one single piece, that is, an integrated insertion portion in which two spaced first holes are formed. Correspondingly, the output port 52 of the startup power source 50 is provided with one second hole for insertion of the insertion portion of the input port 64. Two spaced power terminals are provided within the single second hole. When the insertion portion of the jumper cable device 60 is inserted into the second hole of the startup power source 50, the two power terminals are inserted into the two first holes respectively, and are in contact with the corresponding conductive terminals to achieve an electrical connection.

In this embodiment, the number of the power terminals 546 of the output port 52 of the startup power source 50 is two, and the number of the conductive terminals of the power input end 64 of the jumper cable device 60 is two correspondingly. In other embodiments, the startup power source may further include a first signal terminal. Correspondingly, the jumper cable device may further include a second signal terminal. The two signal terminals may be connected for transmitting a signal, for example, a failure signal of the startup power source described in the above embodiment.

In this embodiment, the connector of the input port 64 of the jumper cable device 60 is designed as a male connector, and the connector of the output port 52 of the startup power source 50 is designed as a female connector. However, in other embodiments, the connector of the input port of the jumper cable device may be designed as a female connector, and correspondingly, the connector of the output port of the startup power source is designed as a male connector.

The first connector of the jumper cable device according to the embodiment of the present disclosure may be connected to the second connector of the startup power source in both directions, which is convenient and quick, and a fool proof mechanism can be omitted.

Figure 12:
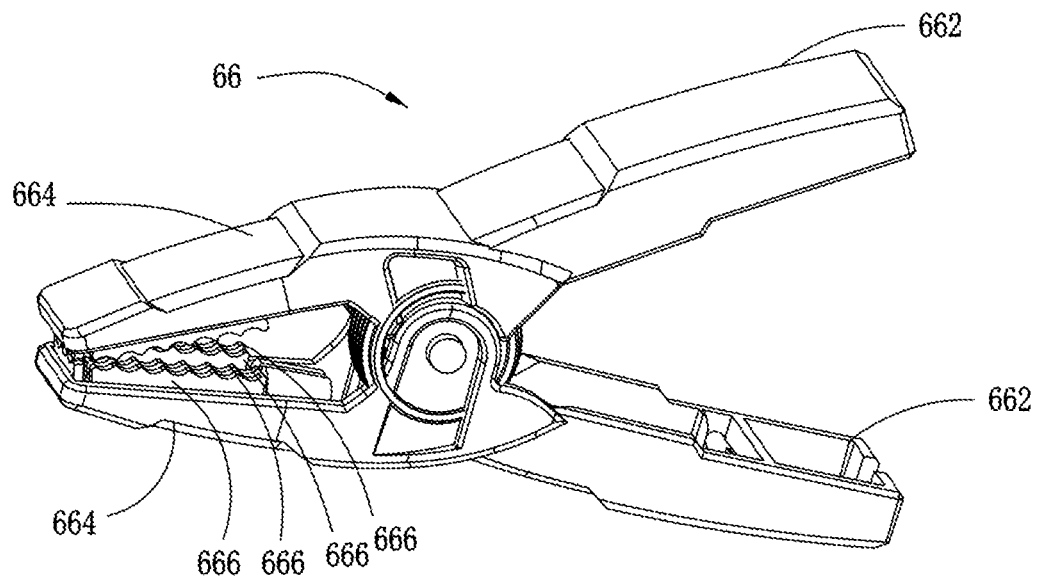
FIG. 12 is a perspective view showing a clamp of the jumper cable device of the jump start system shown in FIG. 9.

With reference to FIG. 12, the first clamp 66 and the second clamp 67 of the jumper cable device 60 are identical in shape and structure. The detailed descriptions will be provided by taking the first clamp 66 as an example.

The first clamp 66 is of a clamp shape and includes two gripping portions 662 at its rear end and two clamping portions 664 at its front end. By manipulating the gripping portions 662, the two clamping portions 664 may be driven to open or close relatively, such that the first clamp 66 is able to be clamped on a battery of an vehicle. Tooth portions 666 are disposed on inner surfaces of the two clamping portions 664 facing each other. The tooth portions 666 extend along longitudinal directions of the clamping portions 664, with top ends being sawtooth-shaped. Due to the tooth portions 666, the clamp 66 can be connected to the vehicle battery firmly, thereby avoiding the disconnection caused by loosening due to vibration. In this embodiment, the first clamp 66 is provided with two sets of tooth portions 666 arranged in parallel therein, and the two sets of tooth portions 666 are spaced apart with a first distance therebetween. Each set of tooth portions 666 includes two rows of tooth portions 666 arranged in parallel. Two rows of tooth portions 666 in each set are arranged adjacently with a second distance defined therebetween. The second distance is smaller than the first distance. In this embodiment, each set of tooth portions 666 includes two rows of tooth portions 666, that is, four rows of tooth portions 666 are provided inside each of the clamping portions 664, and the four rows of tooth portions 666 of the one clamping portion 664 are opposite to the four rows of tooth portions 666 of the other clamping portion 664. Accordingly, the clamping stability of the clamps 66 may be enhanced, and the reliability of the jumper cable device 60 is improved.

Regarding the shape and structure of the second clamp 67, reference can be made to the above descriptions of the first clamp, which will not be repeated herein.

It should be understood that the first clamp 66 and the second clamp 67 in this embodiment may be used as the first clamp 11 and the second clamp according to any one of the above embodiments.

Figure 13:
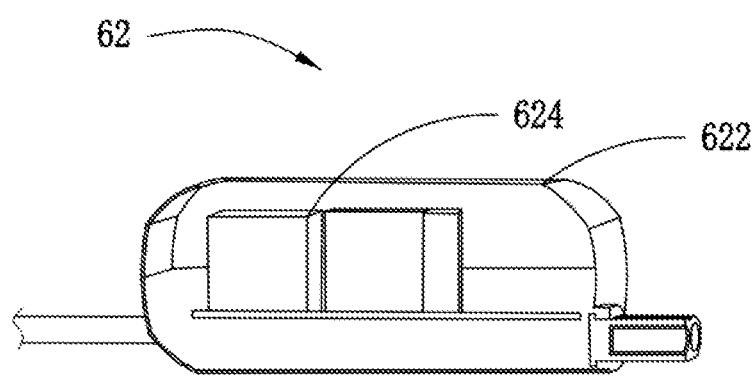
FIG. 13 is a structural schematic view showing a main body of the jumper cable device of the jump start system shown in FIG. 9.

With reference to FIG. 13, the main body 62 of the jumper cable device 60 includes a housing 622 and a control apparatus 624 received within the housing 622. The control apparatus 624 includes the main controller 13, the input polarity detection module 16, the input polarity control module 17 and the voltage stabilization module 18 in the above-mentioned embodiment.

In some embodiments, the input port 64 of the jumper cable device 60 capable of bi-direction insertion according to this embodiment may be implemented in combination with the embodiments with clamps having no predetermined polarities in the above-mentioned embodiments. In that case, the control apparatus 624 further includes the clamp polarity detection module 14 and the clamp connection module 15 described above. For its specific structure and working principle, reference may be made to the descriptions of the above embodiment, which will not be repeated herein.

In the above-mentioned embodiments, the descriptions of various embodiment have their own emphasis. For elements that are not described in detail in a certain embodiment, reference may be made to related descriptions of other embodiments.

The foregoing is the description of the jumper cable device, the control method and the jump start system according to the present disclosure. Modifications may be made by those skilled in the art to the detailed implementations and the applications under the spirit of the embodiments of the present disclosure. In summary, the contents of the descriptions should not be construed as a limitation to the present disclosure.

What is claimed is:

1. A jumper cable device, comprising an input port, a first clamp and a second clamp, wherein the input port is configured to be connected with an external startup power source, and the first and second clamps are configured to be connected to a battery of a load;
   wherein the jumper cable device further comprises a main controller, a clamp polarity detection module and a clamp connection module;
   wherein the main controller is connected to the clamp polarity detection module and the clamp connection module, and the clamp polarity detection module and the clamp connection module are further connected to the first and second clamps; and
   when the first and second clamps are connected to the battery, the clamp polarity detection module is configured to detect polarities of electrodes of the battery to which the two clamps are respectively connected, and the main controller is configured to acquire a detection result signal of the clamp polarity detection module, control the clamp connection module according to the detection result signal to determine polarities of the two clamps according to the polarities of the electrodes of the battery and connect circuits between the input port and the two clamps to boost the battery.

2. The jumper cable device according to claim 1, wherein the clamp polarity detection module comprises a first clamp polarity detection module and a second clamp polarity detection module respectively connected to the first clamp and the second clamp;
wherein the first clamp polarity detection module and the second clamp polarity detection module are both connected to the main controller; and
wherein the main controller is further configured to confirm that the second clamp is connected to a positive electrode of the battery when the first clamp polarity detection module detects that a level signal is pulled down to a low-level signal, and further configured to confirm that the first clamp is connected to a positive electrode of the battery when the second clamp polarity detection module detects that a level signal is pulled down to a low-level signal.

3. The jumper cable device according to claim 2, wherein the main controller is further configured to confirm that the battery is unconnected in circuit to the first and second clamps when the first clamp polarity detection module and the second clamp polarity detection module detects that the level signals are both high-level signals.

4. The jumper cable device according to claim 3, wherein the first clamp polarity detection module comprises a first optocoupler and a first resistor, and the second clamp polarity detection module comprises a second optocoupler and a second resistor.

5. The jumper cable device according to claim 4, wherein a first pin of the first optocoupler is connected to one end of the first resistor, an other end of the first resistor is connected to the first clamp, a second pin of the first optocoupler is connected to the second clamp, a third pin of the first optocoupler is grounded, and a fourth pin of the first optocoupler is connected to a first pin of the main controller; and
wherein a first pin of the second optocoupler is connected to one end of the second resistor, an other end of the second resistor is connected to the second clamp, a second pin of the second optocoupler is connected to the first clamp, a third pin of the second optocoupler is grounded, and a fourth pin of the second optocoupler is connected to a second pin of the main controller.

6. The jumper cable device according to claim 1, further comprising an input polarity detection module, wherein the input polarity detection module is connected to the input port and the main controller; and
wherein the input polarity detection module comprises two electrode terminals connected to the input port and electrically connected to the startup power source when the startup power source is connected to the input port to generate level signals; and the main controller acquires the level signals by means of the input polarity detection module, and determines polarities of electrodes of the startup power source to which the two electrode terminals are respectively connected according to the level signals.

7. The jumper cable device according to claim 6, further comprising an input polarity control module and a voltage stabilization module; and
wherein the input polarity control module is connected to the input polarity detection module and the voltage stabilization module, and the voltage stabilization module is connected to the main controller.

8. The jumper cable device according to claim 7, wherein the input polarity control module comprises two sets of diodes, wherein each set of diodes comprises two diodes, wherein a positive electrode and a negative electrode of one of the two diode are respectively connected to a negative electrode and a positive electrode of the other diode of the two diodes, and each set of diodes is connected to one of the two electrode terminals in the input polarity detection module and configured to rectify a power supply signal from the input polarity detection module and transmit the rectified power supply signal to the voltage stabilization module; and the voltage stabilization module is configured to perform voltage stabilization on the rectified power supply signal and then transmit a resulted signal to the main controller for supplying power to the main controller.

9. The jumper cable device according to claim 8, wherein the input polarity detection module comprises a third optocoupler and a third resistor; the input polarity control module comprises a first diode, a second diode, a third diode, a fourth diode and a fourth resistor; and the voltage stabilization module comprises a voltage stabilization chip.

10. The jumper cable device according to claim 9, wherein a first pin of the third optocoupler is connected to a first electrode terminal of the two electrode terminals, and connected to a positive electrode of the first diode and a negative electrode of the second diode; a second pin of the third optocoupler is connected to a second electrode terminal of the two electrode terminals, and connected to a positive electrode of the third diode and a negative electrode of the fourth diode; a third pin of the third optocoupler is grounded; and a fourth pin of the third optocoupler is connected to a third pin of the main controller;
a negative electrode of the first diode and a negative electrode of the third diode are connected to an input of the voltage stabilization chip through the fourth resistor, and an output of the voltage stabilization chip is connected to a fourth pin of the main controller; and
while the startup power source is connected to the input port, when the third pin of the main controller detects that the level signal is a low-level signal, it is determined that the first electrode terminal is connected to a positive electrode of the startup power source, and the second electrode terminal is connected to a negative electrode of the startup power source; and when the third pin of the main controller detects that the level signal is a high-level signal, it is determined that the first electrode terminal is connected to the negative electrode of the startup power source, and the second electrode terminal is connected to the positive electrode of the startup power source.

11. The jumper cable device according to claim 6, wherein the clamp connection module comprises a plurality of switch control modules and a plurality of switches; and
wherein the plurality of switch control modules are respectively connected to different pins of the main controller in a one-to-one correspondence manner, and respectively connected to the plurality of switches in a one-to-one correspondence manner, and the plurality of switches are connected to the first clamp and the second clamp respectively.

12. The jumper cable device according to claim 11, wherein the main controller is configured to control switching-on of the plurality of switches by the plurality of switch control modules according to the polarities of the electrodes of the startup power source to which the two electrode terminals are respectively connected which are detected by the input polarity detection module, and the polarities of the electrodes of the battery to which the two clamps are respectively connected which are detected by the clamp polarity detection module, so as to connect corresponding circuits between the input port and the battery according to the polarities.

13. The jumper cable device according to claim 6, wherein the clamp connection module comprises a plurality of relay control modules and a plurality of relay switches; and wherein the plurality of relay control modules are respectively connected to different pins of the main controller in a one-to-one correspondence manner, and respectively connected to the plurality of relay switches in a one-to-one correspondence manner, and the plurality of relay switches are connected to the first clamp and the second clamp respectively.

14. The jumper cable device according to claim 13, wherein the main controller is configured to control switching-on of the plurality of relay switches by the plurality of relay control modules according to the polarities of the electrodes of the startup power source to which the two electrode terminals are respectively connected which are detected by the input polarity detection module, and the polarities of the electrodes of the battery to which the two clamps are respectively connected which are detected by the clamp polarity detection module, so as to connect corresponding circuit between the input port and the battery according to the polarities.

15. The jumper cable device according to claim 14, wherein each of the relay control modules comprises two relay control sub-modules, and each of the relay control sub-modules comprises at least one resistor and one triode.

16. The jumper cable device according to claim 15, wherein the plurality of relay switches comprises a first relay switch, a second relay switch, a third relay switch and a fourth relay switch;

wherein one end of the resistor is connected to a pin of the main controller and an other end of the resistor is connected to a base of the triode, and a collector of the triode is connected to a pin of the relay switch;

wherein the first clamp is connected to a first pin of the second relay switch and a first pin of the third relay switch; and wherein the second clamp is connected to a first pin of the first relay switch and a first pin of the fourth relay switch.

17. The jumper cable device according to claim 16, further comprising a plurality of relay detection modules which are configured to detect whether the relay switches are stuck.

18. The jumper cable device according to claim 17, wherein each of the relay detection modules comprises two diodes, one triode and two resistors;

wherein a positive electrode of one of the diodes is connected to a pin of the main controller and a collector of the triode and a negative electrode of the one of the diodes is connected to a fifth pin of a relay switch to be detected, a base of the triode is connected to first ends of the two resistors, a second end of one of the resistors is connected to a negative electrode of an other one of the two diodes, and a positive electrode of the other one of the two diodes is connected to a first pin of the relay switch; and wherein when the pin of the main controller detects that the level signal is pulled up to a high-level signal, it is determined that the relay switch to which the pin is connected is stuck.

19. A jump start system, comprising a startup power source and the jumper cable device according to claim 1, wherein the startup power source comprises an output port, and the input port of the jumper cable device is connected to the output port of the startup power source in an insertable manner.

* * * * *